United States Patent [19]

Suzuki et al.

[11] Patent Number: 5,369,069
[45] Date of Patent: Nov. 29, 1994

[54] METHOD FOR PRODUCTION OF PILLARED CLAY HAVING CATION-EXCHANGE CAPACITY

[75] Inventors: Kenzi Suzuki, Aichi; Toshiaki Mori, Yokkaichi, both of Japan

[73] Assignees: Agency of Industrial Science & Technology; Ministry of International Trade & Industry, Tokyo, Japan

[21] Appl. No.: 137,751

[22] Filed: Oct. 19, 1993

[30] Foreign Application Priority Data

Oct. 20, 1992 [JP] Japan .................. 4-306391
Oct. 20, 1992 [JP] Japan .................. 4-306392

[51] Int. Cl.$^5$ .......................... B01J 21/16; B01J 20/12
[52] U.S. Cl. .......................... 502/63; 502/84
[58] Field of Search .................. 502/63, 84

[56] References Cited

U.S. PATENT DOCUMENTS

| | | | |
|---|---|---|---|
| 4,629,713 | 12/1986 | Suzuki et al. | 502/84 |
| 4,666,877 | 5/1987 | Vaughan | 502/84 |
| 4,753,900 | 6/1988 | Blanchard et al. | 437/50 |
| 4,757,040 | 7/1988 | Guan et al. | 502/63 |
| 4,839,318 | 6/1989 | Kawase et al. | 502/62 |
| 4,855,268 | 8/1989 | Raythatha | 502/63 |
| 5,084,428 | 1/1992 | Suzuki et al. | 502/80 |
| 5,087,598 | 2/1992 | Suzuki et al. | 502/63 |
| 5,214,012 | 5/1993 | Suzuki et al. | 502/62 |

*Primary Examiner*—Carl F. Dees
*Attorney, Agent, or Firm*—Oblon, Spivak, McClelland, Maier, & Neustadt

[57] ABSTRACT

A pillared clay possessing the ability to exchange cations is produced by a method which comprises heating a cation-exchange clay consisting of (1) silicate layers composed of octahedrons of alumina having part of the aluminum thereof substituted by magnesium or octahedrons of magnesia having part of the magnesium thereof substituted by lithium and tetrahedrons of silica and parallelly arranged in a state assuming negative electric charge and (2) exchangeable cations interposed between the silicate layers in a state retaining an electric charge balance with the negative electric charge of the silicate layers, thereby causing part of the exchangeable cations to be fixed in the silicate layers and inducing a decrease in the cation-exchange capacity of the clay, then cross-linking the interstices between the silicate layers of the clay, and thereafter causing liberation of the fixed cations.

By causing a pillared clay which possesses the ability to exchange cations to be further cross-linked with pillars different from the pillars used in the clay, a pillared clay having pillars of a plurality of kinds is produced. By causing a pillared clay which possesses the ability to exchange cations to be further cross-linked with pillars identical with the pillars used in the clay, a pillared clay containing increased amounts of pillars is obtained.

10 Claims, 2 Drawing Sheets

METHOD FOR PRODUCTION OF PILLARED CLAY HAVING CATION-EXCHANGE CAPACITY

BACKGROUND OF THE INVENTION

1. Field of the Invention

This invention relates to a method for the production of a clay having layers thereof cross-linked with pillars and possessing a cation-exchange capacity and a clay having layers thereof cross-linked with pillars different in kind. The products obtained by this invention can be used such as for catalysts, catalyst carriers, adsorbents, separating materials, and cation-exchangers.

2. Prior Art Statement

The present inventors have been granted U.S. Pat. Nos. 4,629,713, 4,753,908, 4,839,318, 5,087,598, 5,084,428 and No. 5,214,012 on their inventions pertaining to methods for production of minute porous clay particles from a smectite type ore as a raw material.

No method has yet been established for the production of a pillared clay having cation-exchange capacity or a pillared clay having the layers thereof cross-linked with a plurality of kinds of pillars.

The clay which is possessed of silicate layers and has these silicate layers cross-linked with pillars is referred to as an "pillared clay".

A pillared clay contains pores of a size closely approximating the size of molecules. It is in the form of a microporous substance which can be expected to manifest the function of a molecular sieve or the function of a shape selector, depending on the size of the interval between the layers or the size of the interval between the pillars. The pillared clay is synthesized by introducing a cationic pillar precursor into the interstices between the silicate layers of such a smectite ore as montmorillonite or hectorite and establishing pillars between the layers. It is therefore devoid of the cation-exchange capacity inherent to the smectite ore. To be usable as a catalyst carrier or a cation exchangers, however, the inter-layer cross-linked clay is required to possess cation-exchange capacity. Moreover, for imparting it with such functions as catalysis and adsorption, the interlayer cross-linked clay is required to use a plurality of kinds of pillars. This invention has been perfected to fulfill these requirements.

SUMMARY OF THE INVENTION

For the purpose of meeting the requirements mentioned above, this invention provides a method for the production of a pillared clay possessed of a cation-exchange capacity, which method comprises heating a cation-exchange clay essentially consisting of (1) silicate layers composed of one kind of octahedrons selected from the group consisting of octahedrons of alumina having part of the aluminum thereof substituted by magnesium and octahedrons of magnesia having part of the magnesium thereof substituted by lithium and tetrahedrons of silica disposed one each on the opposite sides of the octahedrons and sharing oxygen atoms with the octahedrons, assuming a negative electric charge, and parallelly opposed across a space and (2) exchangeable cations interposed between the silicate layers and retraining an electric charge balance with the negative electric charge of the silicate layers, thereby fixing part of the exchangeable cations in hexagonal holes formed by oxygen molecules, which are components of the silicate layers, and consequently decreasing the cation-exchange capacity of the clay, then cross-linking the silicate layers of the clay with pillars thereby giving rise to a pillared clay, and subsequently removing the fixed cations from the hexagonal holes.

The above and other features of the invention will become apparent from the following description made with reference to the accompanying drawings.

DESCRIPTION OF THE PREFERRED EMBODIMENTS

Smectite ore consists of numerous silicate layers about 1 nm in thickness lying one on top of another. Each silicate layer consists of a layer of octahedrons of alumina or octahedrons of magnesia sandwiched between two layers of tetrahedrons of silica. The silicate layers assume a negative electric charge because the $Al^{3+}$ of the layer of octahedrons of alumina has been substituted partially by $Mg^{2+}$, an ion of a small positive electric charge, the $Mg^{2+}$ of the layer of octahedrons of magnesia has been substituted partially by $Li^+$, an ion of a small positive electric charge, and the $Si^{4+}$ of the layer of tetrahedrons of silica has been substituted partially by $Al^{3+}$. The negative electric charge of the silicate layers is compensated for by the presence of such cations as $Na^+$, $Ca^{2+}$, $Ni^{2+}$, and $Al^{3+}$ between the silicate layers. These cations are hydrated and loosely bound electrostatically to the silicate layers and, therefore, are exchangeable for other cations. The amounts of such exchangeable ions as $Na^+$ and $Ca^{2+}$, though variable with such factors as kind of clay and place mined, are generally about 1 meq. per g of clay.

Figure 1:
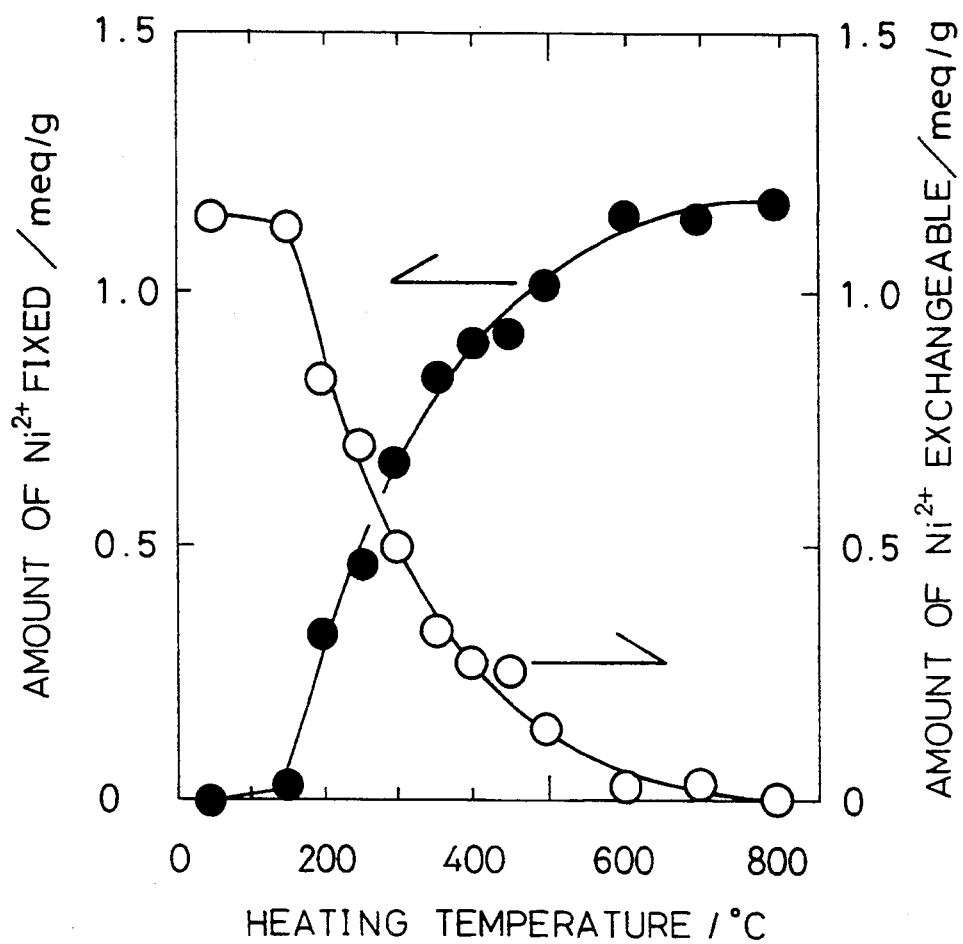
FIG. 1 is a diagram showing the relation between the amounts of fixed $Ni^{2+}$ and exchangeable $Ni^{2+}$ in Ni-montmorillonite and the heating temperature.

The amounts of the exchangeable cations which exist between the silicate layers decrease when the smectite ore is heated. This is because the heating fixes the exchangeable cations in the holes distributed in the surfaces of the silicate layers, i.e. the "hexagonal holes" each formed of six of the oxygen atoms participating in the formation of tetrahedrons of silica (K. Suzuki, M. Horio, and T. Mori, Mat. Res. Bull., Vol. 23, pp. 1711-1718, 1988). These exchangeable cations exist in a hydrated form between the silicate layers. The cations, on being heated, are deprived of the water of hydration and reverted into ordinary cations. Thermal vibration causes these cations to fly into the "hexagonal holes" and electrostatically bind to the oxygen atoms of negative electric charge, with the result that the smectite ore ceases to manifest the ability to exchange ions. This phenomenon is called fixation. The amount of this fixation caused by the heating varies with the kind of cation, the temperature of the heating, and the heating period. While such cations as $Na^+$ and $Ca^{2+}$ are not easily fixed even when they are heated at a temperature of up to 600° C., such cations as $Ni^{2+}$ and $Al^{3+}$ are easily fixed at temperatures falling in the range of 200° to 300° C. The heating temperature, though widely variable with the kind of exchangeable cation as described above, falls in the range of 120° to 800° C. The relation between the amount of $Ni^{2+}$ fixed and the heating temperature and the relation between the amount of exchangeable $Ni^{2+}$ and the heating temperature, both obtained of montmorillonite ore having $Ni^{2+}$ as exchangeable cations, are shown in FIG. 1. In this graph, the solid dots ● indicate the amount of fixed $Ni^{2+}$ and the open dots ○ the amount of exchangeable $Ni^{2+}$. The heating period was fixed at one hour for all the temperatures used. From the curve of the relation between the amount of fixed $Ni^{2+}$ and the heating temperature, it is clear that the amount of fixed $Ni^{2+}$ increases in proportion as the heating temperature is elevated. The amount of exchangeable $Ni^{2+}$ decreases in proportion as the amount of fixed $Ni^{2+}$ is increased and eventually reaches almost nil when the heating temperature reaches 600° C. When the temperature of heating is fixed, the amount of fixation increases in proportion as the heating period is increased. When the heating period is further increased, the amount of fixation tends to saturate. In the case of Ni-montmorillonite, for example, the amount of fixed $Ni^{2+}$ saturates when the heating period exceeds 65 hours at a heating temperature of 300° C. The "hexagonal holes" measure 0.14 nm in radius, i.e. the size of one oxygen atom. Therefore, cations having a radius of less than 0.14 nm can be fixed in such "hexagonal holes", whereas cations having a radius of more than 0.14 nm cannot enter these holes and are not fixed therein. The cations which can be used for this invention are limited to those which measure not more than 0.14 nm in radius. The heating temperature to be used for this invention is in the range from 120° C., the temperature at which cations are deprived of the water of hydration, to 800° C., the temperature at which the crystal structure of the smectite ore breaks down.

Now, the liberation of fixed cations will now be described. U.S. Pat. No. 5,084,428 mentioned above discloses an invention which pertains to this particular operation. To be specific, it teaches a method for enabling montmorillonite which has had the cation-exchange capacity thereof degraded in consequence of fixation of ions to recover its cation-exchange capacity by subjecting the affected ore to a hydrothermal treatment under application of pressure and heat. The liberation is effected, for example, by placing the smectite ore in a finely divided form in a beaker, setting this beaker in an autoclave, and allowing the powder in the beaker to stand in a pressed state in the autoclave at a temperature in the range of 100° to 350° C. for a period in the range of one to 24 hours. If the temperature of this treatment is lower than 100° C., the liberation requires an unduly long time because the pressure of the steam is low. If this temperature exceeds 350° C., the crystal structure of the smectite ore breaks down. The hydrothermal treatment for the liberation of the fixed cations is therefore desirably carried out at a temperature in the range of 100° to 350° C. Though the amount of the fixed cations liberated by the hydrothermal treatment increases in proportion as the treatment period is prolonged, a period not exceeding 24 hours generally suffices to effect the treatment thoroughly. However, the hydrothermal treatment may be carried out for a longer time if necessary. When the hydrothermal treatment is carried out on a suspension prepared by adding a smectite ore containing fixed cations to an aqueous solution containing such polyvalent cations as $Al^{3+}$ and $Ni^{2+}$, the fixed cations are liberated in a larger amount than when the hydrothermal treatment is performed on the powdered smectite ore. When Ni-montmorillonite having an exchangeable cation content of 1.2 meq/g, for example, is heated at 400° C. for one hour, the amount of exchangeable cations is 0.17 meq/g. When the resultant ore is subjected in the powdered form to the hydrothermal treatment at 200° C. for five hours, the amount of $Ni^{2+}$ liberated is 0.09 meq/g and the amount of exchangeable cations is increased to 0.26 meq/g. When the suspension prepared by addition to the aqueous $Al^{3+}$ solution is subjected to the hydrothermal treatment at 200° C. for five hours, the amount of $Ni^{2+}$ liberated is 0.51 meq/g and the amount of exchangeable cations is increased to 0.68 meq/g.

The method for synthesizing the pillared clay having the ability to exchange cations in accordance with this invention will now be described. As concrete examples of smectite ores which are usable in the present invention, montmorillonite, hectorite, beidellite, saponite, rectorite, taeniolite, and mica may be cited. Other clayish ores than those just mentioned are likewise usable so long as they are constituted of layers and have the ability to exchange cations.

The composition of the smectite ore and the phenomenon of fixation of part of the exchangeable cations intervening between the silicate layers when the ore is heated have already been described. When the clay has had its ability to exchange cations degraded in consequence of the fixation of part of the exchangeable cations, the silicate layers of this clay are cross-linked with pillars.

The method which is typically adopted for the purpose of this cross-linkage will now be described. The smectite ore is thoroughly stirred in water (for example, distilled water) to prepare a suspension. To this suspension, a pillar precursor of cationic oligomer is added. $[Al_{13}O_4(OH)_{24}(H_2O)_{12}]^{2+}$ is used as an alumina pillar precursor and $[Zr_4(OH)_{14}(H_2O)_{18}]^{2+}$ as a zirconia pillar precursor. The former precursor is prepared by keeping an aqueous $AlCl_3$ solution vigorously stirred and adding an alkali piecemeal to the stirred aqueous solution until the OH/Al ratio reaches a level in the approximate range of 2 to 2.5. It may be an aqueous solution of $Al_2(OH)_5Cl.2.4H_2O$. The latter precursor is an aqueous solution of $ZrOCl_2$. The only requirement of the pillar precursor used in the method of production according with this invention is that it be a cationic oligomer. The addition of the pillar precursor is followed by the steps of aging, washing with water, drying, heating, and grinding to complete synthesis of the pillared clay. The aging only requires the suspension containing the precursor to stand at rest in the presence or absence of heating. The washing with water has to be continued until the washings cease formation of a white precipitate therein in response to dropwise addition thereto of an aqueous silver nitrate solution. The drying may be attained by any of the known methods such as, for example, natural drying, vacuum drying, freeze drying, and heat drying. The heating is performed at a temperature not exceeding 800° C., the upper limit for avoiding breakdown of the crystal structure of a smectite ore. Generally, one hour's heating at 400° or 500° C. is satisfactory. The grinding is conducted by any of the known methods and may be carried out with a mortar or a ball mill, for example. The steps of aging, heating, and grinding may be carried out different order. Some of these steps may be omitted when necessary. There are times when the sole step of heating or drying proves sufficient. Absolutely no exchangeable cation is found in the pillared clay which has been synthesized as described above. In other words, the synthesized pillared clay has absolutely no cation-exchange capacity.

The method for imparting the pillared clay mentioned above with a cation-exchange capacity will now be explained. This method simply amounts to liberating the cations which are fixed on the pillared clay. The conditions for the liberation of the fixed cations have already been described.

When the inter-layer cross-linked clay mentioned above and such polyvalent cations such as $Al^{3+}$ or $Ni^{2+}$ added thereto are subjected together to a hydrothermal treatment, the liberation of fixed cations can be attained with high efficiency.

The temperature and treatment period for liberating the fixed cations may be varied according to necessity. The period is not limited to 24 hours but may be longer as required. When economy is taken into account, however, it is desired to be as short as permissible. It may be about five hours, for example. After the hydrothermal treatment is completed, the product of the treatment is dried at a temperature not exceeding 100° C. The reason for selecting this particular temperature is that the exchangeable cations liberated from the fixation are safe from being fixed again on the pillared clay at this temperature. Owing to the treatment mentioned above, the cations which are fixed to the silicate layers are liberated. As a result, the pillared clay acquires an ability to exchange cations. In this case, the cation-exchange capacity of the pillared clay is proportional to the amount of cations which have been liberated. The cation-exchange capacity acquired by the pillared clay can therefore be controlled by suitably selecting the conditions of fixation, the conditions of treatment, etc.

In the pillared clay produced and imparted with the ability to exchange cations by the method described above, the pillars used for cross-linking the silicate layers are of one kind.

In the case of imparting a number of different functions to the pillars, the pillared clay possessing the ability to exchange cations is required to have pillars of different kinds. A pillared clay satisfying this requirement is obtained simply by preparing a pillared clay by the method described above and subjecting this pillared clay further to an inter-layer cross-linking treatment using a cationic oligomer precursor different in kind from the cationic oligomer precursor used in the pillared clay mentioned above.

Figure 2:
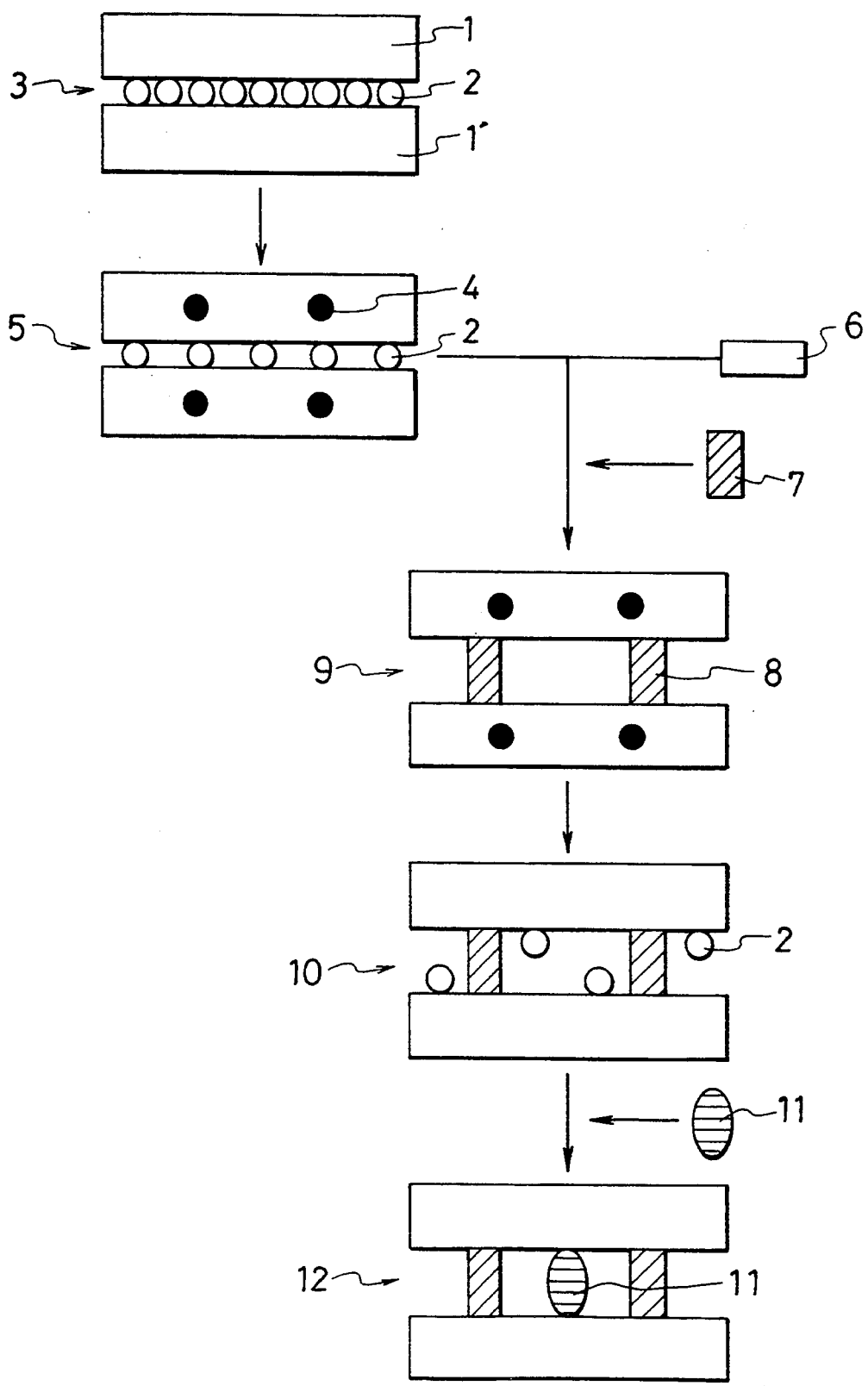
FIG. 2 is a diagram illustrating a process for the production according to this invention.

To be more specific, the pillared clay produced by the method described above and possessed of the ability to exchange cations is dispersed in distilled water, a pillar precursor of a different kind is added to the resultant dispersion, and the resultant mixture is subjected to an inter-layer cross-linking treatment performed by the same method as described above. Thus, the pillared clay consequently obtained contains the pillars introduced by the first inter-layer cross-linking treatment plus the pillars introduced by the second inter-layer cross-linking treatment. The process used for the method of production of this invention described above is illustrated in FIG. 2. In this diagram, 1, 1' stand for adjacent silicate layers and 2 stands for exchangeable cations interposed between the silicate layers. A smectite ore 3, which is a cation-exchange clay, is formed of these silicate layers and exchangeable cations.

When the smectite ore is heated, part of the exchangeable cations are fixed on the silicate layers. Reference numeral 4 stands for the fixed exchangeable cations. Thus, reference numeral 5 stands for a smectite ore which has had its ability to exchange cations degraded in consequence of partial fixation of exchangeable cations. Then, this clay is dispersed in water (for example, distilled water) 6 and a pillar precursor 7 of a cationic oligomer is added to the resultant dispersion and the produced mixture is subjected to a drying treatment and/or a heating treatment to cross-link the silicate layers with pillars 8 formed between the silicate layers. In other words, a pillared clay 9 possessing fixed cations is formed. In the pillared clay thus produced, the exchangeable cations which were formerly present between the adjacent layers are no longer present. When the pillared clay 9 is heated in the presence of compressed steam (specifically by placing the clay in a cylinder and heating the cylinder containing the clay in an autoclave, for example), the cations fixed on the silicate layers are liberated and caused to migrate to the interstices between the silicate layers, with the result that a pillared clay 10 possessing an ability to exchange cations is obtained. When pillars are formed between the silicate layers by using a pillar precursor 11 different in kind from the pillar precursor 7, a pillared clay 12 having pillars of different kinds can be produced. When fixed cations persist on the mother clay even after the second cross-linking treatment, a pillared clay having pillars of three kinds interposed between the adjacent silicate layers can be produced liberating the fixed cations once more and then carrying out a cross-linking treatment.

Further, a pillared clay possessing the ability to exchange cations and using pillars of one and the same kind in different amounts between different silicate layers can be easily produced by repeating the cross-linking treatment in the method described above using one and the same pillar precursor.

Now, this invention will be described more specifically below with reference to working examples.

EXAMPLE 1

Ni-montmorillonite having a cation-exchange capacity of 0.37 meq/g was obtained by one hour's heating at 300° C. In 500 ml of distilled water, 3.0 g of the Ni-montmorillonite was thoroughly stirred. The resultant suspension was kept stirred and 50 ml of an aqueous 10 wt. % $Al_2(OH)_5Cl.2.4H_2O$ solution was added piecemeal to the stirred suspension at normal room temperature. After the addition was completed, the mixture was left standing at normal room temperature for 24 hours. The mixture was filtered. The product of synthesis was washed with water and then left drying in an oven at 60° C. for three days. The dried mass was ground with a mortar to afford a pillared clay. In this pillared clay, the pillars were formed of $Al(OH)_3$ and the pillar content was 54 mg/g. In 20 ml of an aqueous 0.25N $AlCl_3$ solution, 1.0 g of the pillared clay was suspended. The suspension consequently obtained was placed in a test tube and subjected to a heat treatment in an autoclave. The heating period was fixed at five hours and the heating temperature was varied from 100° C. to 150° C. 200° C. and 250° C. The samples from the test runs using different heating temperatures were quantitatively assayed by atomic absorption spectrophotometry to determine the amounts of $Ni^{2+}$ liberated into solutions, namely the cation-exchange capacity of the clay. The results are shown in Table 1.

TABLE 1

| | (in meq/g) | | |
|---|---|---|---|
| 100° C. | 150° C. | 200° C. | 250° C. |
| 0.21 | 0.36 | 0.52 | 0.54 |

Then, the heating temperature was fixed at 200° C. and the heating period was varied from one hour to two hours, five hours, and 25 hours. The samples from the test runs using different heating periods were quantitatively assayed by atomic absorption spectrophotometry to determine the amounts of $Ni^{2+}$ liberated into solutions, namely the cation-exchange capacity of the clay. The results are shown in Table 2.

TABLE 2

| | (in meq/g) | | |
|---|---|---|---|
| One hour | Two hours | Five hours | 25 hours |
| 0.37 | 0.45 | 0.52 | 0.52 |

When the suspension mentioned above was left standing at rest for 24 hours, no $Ni^{2+}$ was detected in the solution. The $Al^{3+}$ concentration in the aqueous $AlCl_3$ solution was not varied by the addition of the pillared clay.

EXAMPLE 2

Ni-montmorillonite having a cation-exchange capacity of 0.17 meq/g was obtained by one hour's heating at 400° C. A pillared clay was synthesized by following the procedure of Example 1, except that the Ni-montmorillonite just mentioned was used instead. In 20 ml of an aqueous 0.25N $AlCl_3$ solution, 1 g of the pillared clay was suspended. The suspension consequently obtained was placed in a test tube and subjected to a heat treatment in an autoclave. Similarly to the procedure of Example 1, the heating period was fixed at five hours and the heating temperature was varied in one experiment while the heating temperature was fixed at 200° C. and the heating period was varied in another experiment. The samples from the test runs were assayed to determine the amounts of $Ni^{2+}$ liberated in solutions. The results are shown in Table 3 and Table 4.

TABLE 3

| | (in meq/g) | | | |
|---|---|---|---|---|
| 100° C. | 150° C. | 200° C. | 250° C. | 275° C. |
| 0.16 | 0.35 | 0.51 | 0.62 | 0.66 |

TABLE 4

| | (in meq/g) | | |
|---|---|---|---|
| One hour | Two hours | Five hours | 25 hours |
| 0.37 | 0.44 | 0.51 | 0.61 |

When the suspension mentioned above was left standing at rest for 24 hours, no $Ni^{2+}$ was detected in the solution. The $Al^{2+}$ concentration in the aqueous $AlCl_3$ solution was not varied by the addition of the pillared clay.

EXAMPLE 3

A pillared clay A (having no cation-exchange capacity) using pillars of $Al(OH)_3$ in a content of 54 mg/g of clay was produced by the procedure of Example 1. In 20 ml of an aqueous 0.25N $NiCl_2$ solution, 1 g of the pillared clay A was suspended. The suspension consequently obtained was placed in a test tube and subjected to a hydrothermal treatment at 200° C. for five hours in an autoclave, washed with water, filtered, and dried in an oven at 60° C. The pillared clay resulting from the hydrothermal treatment (referred to as "pillared clay B") was found to have a cation-exchange capacity of 0.52 meq/g.

In 300 ml of distilled water, 1.0 g of the pillared clay B was thoroughly stirred. The resultant suspension was kept vigorously stirred and 20 ml of an aqueous 0.25N $ZrOCl_2$ solution was added to the stirred suspension at normal room temperature. After the addition was completed, the suspension was left standing at rest at normal room temperature for 24 hours. It was subsequently filtered. The product of synthesis consequently obtained was washed with water and left to dry in an oven at 60° C. for three days to afford a pillared clay (referred to as "pillared clay C"). The amount of Zr pillars formed in the pillared clay C was 170 mg of $Zr(OH)_4$/g and the specific surface area of the pillared clay was 206 $m^2$/g. Thus, the pillars contained in the pillared clay synthesized by the method described above were 54 mg of $Al(OH)_3$ and 170 mg of $Zr(OH)_4$ per g of clay.

EXAMPLE 4

Ni-montmorillonite having a cation-exchange capacity of 0.17 meq/g was obtained by one hour's heating at 400° C. In 500 ml of distilled water, 3.0 g of the Ni-montmorillonite was thoroughly stirred. The resultant suspension was kept vigorously stirred and 50 ml of an aqueous 0.25N $ZrOCl_2$ solution was added piecemeal to the stirred suspension at normal room temperature. After the addition was completed, the resultant mixture was left standing at rest at normal room temperature. The mixture was subsequently filtered. The product of synthesis consequently obtained was washed with water and left to dry in an oven at 60° C. for three days. The dried mass was ground with a mortar to afford a pillared clay A'. The amount of Zr pillars in the pillared clay A' was 54 mg of $Zr(OH)_6$/g.

The suspension of 1.0 g of the pillared clay A' in 20 ml of an aqueous 0.25N $NiCl_2$ solution was placed in a test tube and subjected to a hydrothermal treatment in an autoclave at 250° C. for five hours, washed with water, filtered, and left drying in an oven at 60° C. The pillared clay resulting from the hydrothermal treatment (referred to as "pillared clay B'") was found to have a cation-exchange capacity of 0.62 meq/g.

In 300 ml of distilled water, 1.0 g of the pillared clay B' was thoroughly stirred. The suspension which was consequently obtained was kept vigorously stirred and 20 ml of an aqueous 10 wt. % $Al_2(OH)_5Cl.2.4H_2O$ solution was added to the stirred suspension at normal room temperature. After the addition was completed, the resultant mixture was left standing at rest at normal room temperature for 24 hours. It was then filtered. The product of synthesis consequently obtained was washed with water and left to dry in an oven at 60° C. for three days to afford a pillared clay (referred to as "pillared clay C'"). The amount of Al pillars in the pillared clay C' was 90 mg of $Al(OH)_3$/g and the specific surface area of the clay C' was 330 $m^2$/g. Thus, the pillars contained in the pillared clay synthesized by the procedure described above were 54 mg of $Zr(OH)_4$ and 90 mg of $Al(OH)_3$ per g of clay.

EXAMPLE 5

In 20 ml of an aqueous 0.25N $NiCl_2$ solution, 1.0 g of a pillared clay having a pillar content of 54 mg/g and obtained by the same treatment as in Example 1 was suspended. The resultant suspension was placed in a test tube, subjected to a hydrothermal treatment in an autoclave at 200° C. for five hours, washed with water, filtered, and dried in an oven at 60° C. The pillared clay resulting from the hydrothermal treatment (referred to as "pillared clay D") was found to have a cation-exchange capacity of 0.52 meq/g.

In 300 ml of distilled water, 1.0 g of the pillared clay D was thoroughly stirred. The suspension consequently obtained was kept vigorously stirred and 20 ml of an aqueous solution containing 10% by weight of $Al_2(OH)_5Cl.2.4H_2O$ was added to the stirred suspension. After the addition was completed, the resultant mixture was left standing at rest at normal room temperature for 24 hours. Then, the mixture was filtered and the product of synthesis consequently obtained was washed with water and left to dry in an oven at 60° C. for three days to effect synthesis of a pillared clay (referred to as "pillared clay E"). This clay E was found to have a pillar content of 184 mg of $Al(OH)_3$/g.

These results indicate that as a result of the treatment the pillared clay acquired in increase in the pillar content of about 130 mg of $Al(OH)_3$/g. It will be understood that a pillared clay using pillars of one and the same kind in different amounts in different interstices can be produced in accordance with this invention.

What is claimed is:

1. A method for the production of a pillared clay possessed of a cation-exchange capacity, which method comprises heating a cation-exchange clay essentially consisting of (1) silicate layers composed of one kind of octahedrons selected from the group consisting of octahedrons of alumina having part of the aluminum thereof substituted by magnesium and octahedrons of magnesia having part of the magnesium thereof substituted by lithium and tetrahedrons of silica disposed one each the opposite sides of the octahedrons and sharing oxygen atoms with the octahedrons, assuming a negative electric charge, and parallelly opposed across a space and (2) exchangeable cations interposed between the silicate layers and retaining an electric charge balance with the negative electric charge of the silicate layers, thereby fixing part of the exchangeable cations in hexagonal holes formed by oxygen molecules, which are components of the silicate layers, and consequently decreasing the cation-exchange capacity of the clay, then cross-linking the silicate layers of the clay with pillars thereby giving rise to a pillared clay, and subsequently reproving the fixed cations from the hexagonal holes.

2. A method according to claim 1, wherein the exchangeable cations intervening between the silicate layers have a maximum ion radius of 0.14 nm.

3. A method according to claim 2, wherein the exchangeable cations are at least one selected from among $Na^+$, $Ca^{2+}$, $Ni^{2+}$, and $Al^{3+}$.

4. A method according to claim 1, wherein the cation-exchange clay is a smectite ore.

5. A method according to claim 1, wherein the heating temperature of the cation-exchange clay is in the range of 120° to 800° C.

6. A method according to claim 1, wherein the cross-linkage of the clay having a decreased cation-exchange capacity is carried out by adding the clay to water thereby forming a suspension, adding a pillar precursor of a cationic oligomer to the suspension, and subsequently conducting a drying treatment and/or a heating treatment.

7. A method according to claim 1, wherein the liberation of fixed cations from pores in the pillared clay is accomplished by heating the pillared clay in water at 100° to 350° C. under pressure.

8. A method according to claim 7, wherein the water is an aqueous solution containing polyvalent cations.

9. A method for the production of a pillared clay having pillars of a plurality of kinds, characterized by subjecting a pillared clay possessing the ability to exchange cations and obtained by the method of claim 1 further to a cross-linking treatment using pillars different in kind from the pillars of the mother clay.

10. A method for increasing the amount of pillars of a pillared clay, characterized by subjecting a pillared clay possessing the ability to exchange cations and obtained by the method of claim 1 further to a cross-linking treatment using the same pillars as used in the mother clay.

* * * * *